(12) United States Patent
Bialkowski et al.

(10) Patent No.: US 8,155,203 B2
(45) Date of Patent: Apr. 10, 2012

(54) METHOD FOR TRANSCODING A DATA STREAM COMPRISING ONE OR MORE CODED, DIGITISED IMAGES

(75) Inventors: Jens-Günter Bialkowski, Nürnberg (DE); André Kaup, Effeltrich (DE)

(73) Assignee: Siemens Aktiengesellschsft, Munich (DE)

( * ) Notice: Subject to any disclaimer, the term of this patent is extended or adjusted under 35 U.S.C. 154(b) by 1733 days.

(21) Appl. No.: 10/572,645

(22) PCT Filed: Sep. 16, 2004

(86) PCT No.: PCT/EP2004/052196
§ 371 (c)(1),
(2), (4) Date: Mar. 20, 2006

(87) PCT Pub. No.: WO2005/029866
PCT Pub. Date: Mar. 31, 2005

(65) Prior Publication Data
US 2006/0209948 A1 Sep. 21, 2006

(30) Foreign Application Priority Data
Sep. 18, 2003 (DE) .................................. 103 43 220

(51) Int. Cl.
*H04B 1/66* (2006.01)
*H04N 7/12* (2006.01)
*H04N 11/02* (2006.01)
*H04N 11/04* (2006.01)

(52) U.S. Cl. ................................. 375/240.2; 375/240.24

(58) Field of Classification Search ............... 375/240.2, 375/240.24
See application file for complete search history.

(56) References Cited

U.S. PATENT DOCUMENTS
6,310,915 B1 * 10/2001 Wells et al. ............... 375/240.03
2003/0138150 A1 7/2003 Srinivasan

OTHER PUBLICATIONS

P. N. Tudor et al., "Real-Time Transcoding of MPEG-2 Video Bit Streams", Internationall Broadcasting Convention, Amsterdam, Sep. 1997; pp. 296-301.
N. Björk et al.; "Video Transcoding for Universal Multimedia Access"; Proceedings of the 2000 International Multimedia Conference; Marina del Rey; Oct.-Nov. 2000, pp. 75-79.

(Continued)

*Primary Examiner* — Shuwang Liu
*Assistant Examiner* — Nader Bolourchi
(74) *Attorney, Agent, or Firm* — Staas & Halsey LLP

(57) ABSTRACT

An input data stream coded using a first coding method and containing at least one coded digitized image is converted into an output data stream that is coded using a second coding method. The input data stream has first intra-blocks, each of which is coded in a first prediction mode of a plurality of first intra-prediction modes, and the output data stream has second intra-blocks, each of which is coded in a second prediction mode of a plurality of second intra-protection modes. The second prediction modes of one or more second intra-blocks are determined with the aid of the first prediction modes for one or more first intra-blocks and the second intra-blocks are coded using the second prediction modes that are thus determined. In particular, prediction errors that are assigned to the first intra-blocks are taken into consideration for the determination of the second prediction modes.

5 Claims, 4 Drawing Sheets

OTHER PUBLICATIONS

N. Feamster et al.; "An MPEG-2 to H.263 Transcoder"; Proceedings of SPIE: Symposium on Voice, Video, and Data Communications; Boston; Sep. 1999, pp. 164-175.

Jun Xin et al., Motion Re-estimation for MPEG-2 to MPEG-4 Simple Profile Transcoding; Proceedings of the Internationall Packet Video Workshop; 2002, 8 pp.

O. Werner, "Generic Quantiser for Transcoding of Hybrid Video", Proceedings of the Picture Coding Symposium, Berlin, Sep. 1997, 6 pp.

Wiegand et al., "Overview of the H.254/AVC Video Coding Standard", IEEE Transactions on Circuits and Systems for Video Technology, vol. 13, No. 7, Jul. 2003, pp. 560-576.

Telecommunication Standardization Sector of ITU (ITU-T); Series H: Audiovisual and Multimedia Systems: Infrastructure of audiovisual services—Coding of moving video; Video Coding for Low Bit Rate Communication (H.263), Feb. 1998; pp. 1-155.

International Search Report for International Application No. PCT/EP2004/051296 mailed Feb. 15, 2005.

Telecommunication Standardization Sector of ITU (ITU-T); Series H: Audiovisual and Multimedia Systems: Infrastructure of audiovisual services—Coding of moving video; Advanced Video Coding for Generic Audiovisual Services (H.264), Mar. 2005; pp. 1-330.

"New Intra Prediction Modes", ITU-Telecommunications Standardization Sector, Study Group 16, Question 6, VCEG; Sep. 2001, VCEG N54; pp. 1-10.

Draft ITU-T Recommendation and Final Draft International Standard of Joint Video Specification (ITU-T Rec. H.264 | ISO/IEC 14496-10 AVC), May 2003, pp. i-xv, 1-253.

* cited by examiner

METHOD FOR TRANSCODING A DATA STREAM COMPRISING ONE OR MORE CODED, DIGITISED IMAGES

CROSS REFERENCE TO RELATED APPLICATIONS

This application is a national phase application of PCT Application No. PCT/EP2004/052196 filed on Sep. 16, 2004 and hereby claims priority to German Application No. 103 43 220.5 filed on Sep. 18, 2003, the contents of which are hereby incorporated by reference.

BACKGROUND OF THE INVENTION

1. Field of the Invention

The invention relates to a method for transcoding a data stream and to a corresponding transcoding device.

2. Description of the Related Art

Video coding methods enable large data sets of image material to be compressed with different degrees of quality and at different data rates. It is often necessary in this case to adapt the data in a modified form to a transmission or to a terminal device. In particular it may be necessary to convert the data stream of one video coding standard into a data stream of another video coding standard. A conversion of the data stream of this kind is referred to as transcoding.

Transcoding methods in which a data stream is fully decoded and subsequently encoded in a new coding standard are known from the prior art. This approach leads to losses in terms of quality and is also very complex as a result of the decoding and subsequent recoding, resulting in a negative effect on the duration of the conversion of the data stream.

A reduction in the complexity of currently popular transcoding methods is achieved in P. N. Tudor and O. H. Werner; Real-Time Transcoding of MPEG-2 Video Bit Streams; International Broadcasting Convention; Amsterdam; September 1997; pp. 286-301, and O. H. Werner; Generic Quantiser for Transcoding of Hybrid Video; Proceedings of the Picture Coding Symposium; Berlin; September 1997, by reducing the computational overhead for the motion estimation. With the approaches proposed in these documents, the prediction vectors normally used for the recoding, by which the movement in the current image is predicted from an image preceding it in time, is re-estimated only in a greatly reduced search area rather than in the entire image. The reduced search area comprises only a few pixels or only half-pixel or quarter-pixel environments. It has been shown that as a result, the degree of complexity can be considerably reduced and at the same time the quality of the transcoded data stream is made only slightly worse.

The above-described improvement in transcoding methods is suitable in particular for transcodings which take place within the same compression standard. A method is also known from N. Björk, Ch. Christopoulos; Video Transcoding for Universal Multimedia Access; Proceedings of the ACM Multimedia 2000; Marina del Rey; October-November 2000, wherein a transcoding is made possible in the same compression standard, with the motion vectors used additionally being scaled in accordance with a change in the image size and subsequently being re-estimated in turn in a reduced search area. Further approaches for transcoding from one standard to another standard are known from N. Feamster and S. Wee; An MPEG-2 to H.263 Transcoder; Proceedings of Symposium and Voice, Video, and Data Communications; Boston; September 1999, and J. Xin et al.; Motion Reestimation for MPEG-2 to MPEG-4 Simple Profile Transcoding Proceedings of the International Packet Video Workshop; 2002.

The standard methods according to the prior art simplify the transcoding of the data stream for coding methods in which a temporal prediction of the image blocks of a digitized image takes place. However, new compressions methods increasingly use what are referred to as intra-prediction methods in which the individual image blocks within a digitized image are predicted locally from already coded image blocks in the same image. With an intra-prediction of this kind compression is improved further.

To date, no methods from the prior art are known by which an economical transcoding entailing little effort is ensured for a compression standard using intra-prediction.

SUMMARY OF THE INVENTION

An object of the invention is therefore to provide a method for transcoding a data stream wherein a transcoding that is economical in its use of resources is made possible in the use of at least one compression standard with intra-prediction.

According to the invention a method for transcoding a data stream is provided wherein an input data stream coded using a first coding method is converted into an output data stream coded using a second coding method, the input data stream having first intra-blocks, each of which is coded in a first prediction mode from a plurality of first intra-prediction modes, and the output data stream having second intra-blocks, each of which is coded in a second prediction mode from a plurality of second intra-prediction modes. In the method, second prediction modes for one or more second intra-blocks are determined with the aid of the first prediction modes for one or more first intra-blocks, and the second intra blocks are coded using the determined second prediction modes.

The invention is therefore based on the idea that the intra-prediction modes for a second coding method can be determined with the aid of information from the first coding method by which the data stream to be transcoded is coded, with the result that no re-estimation of all the prediction modes needs to be carried out in the second coding method. In a first variant of the invention the first intra-prediction modes of the first coding method are used here as information for determining the second intra-prediction modes.

In a preferred embodiment of the invention prediction errors assigned to the first intra-blocks are taken into account for determining the second prediction modes. In this way a further criterion is introduced which can be taken into account as well in the determination of the second prediction modes.

In a further particularly preferred embodiment of the invention the first coding method is H.264 (see "Draft ITU-T Recommendation and Final Draft International Standard of Joint Video Specification (ITU-T Rec. H.264 | ISO/IEC 14496-10 AVC)," May 2003), the first intra-blocks in this method being coded using intra-prediction modes in the local area. The second coding method is the H.263 standard (see ITU-T Rec. H.263: "Video coding for low bit rate communication," February 1998), in which the second intra-blocks are coded using intra-prediction modes in the frequency range. In a transcoding from H.264 to H.263 the second intra-prediction modes are determined from the first intra-prediction modes preferably by the following assignment, with the reference characters used in the drawings followed by the corresponding character strings that appear in the standards inside parentheses:

if a macro block in H.264 is coded using the INTRA16 (Intra 16×16) prediction mode HOR (Intra 16×16 Horizontal), the intra-prediction mode HOR is assigned to the corresponding four (8×8) pixel blocks in H.263;

if a macro block in H.264 is coded using the INTRA16 prediction mode DC (Intra 16×16 DC) or PLANE (Intra 16×16 PLANE), the intra-prediction mode DC is assigned to the corresponding four (8×8) pixel blocks in H.263;

if a macro block in H.264 is coded using the INTRA16 prediction mode VERT (Intra 16×16 Vertical), the intra-prediction mode VERT is assigned to the corresponding four (8×8) pixel blocks in H.263;

if the (4×4) pixel blocks of a macro block in H.264 are coded using INTRA4 prediction modes (Intra4×4PredMode), the frequency of the prediction modes in the macro block is determined, the following assignment being made as a function of the prediction mode occurring most frequently in the macro block:

if the INTRA4 prediction mode Hor (Intra 4×4 Horizontal) or HorU (Intra 4×4 Hori-zontal Up) occurs most frequently, the intra-prediction mode HOR is assigned to the corresponding four (8×8) pixel blocks of the macro block in H.263;

if the INTRA4 prediction mode DC (Intra 4×4 DC) or HorD (Intra 4×4 Horizontal Down) or VerR lIntra 4×4 Vertical Right) or DiagDR lIntra 4×4 Diagonal Down Right) occurs most frequently, the intra-prediction mode DC is assigned to the corresponding four (8×8) pixel blocks of the macro block in H.263;

if the INTRA4 prediction mode DiagDL (Intra 4×4 Diagonal Down Left) or VERT (Intra 4×4 Vertical) or VerL (Intra 4×4 Vertical Left) occurs most frequently, the intra-prediction mode VERT is assigned to the corresponding four (8×8) pixel blocks of the macro block in H.263.

The inventors were able to demonstrate that an efficient transcoding is achieved with this assignment of the intra-prediction modes used in H.264 and H.263, the complexity of the transcoding being substantially reduced compared with known methods.

If, in the last-described embodiment of the invention, INTRA4 prediction modes occur with the same frequency during the assignment of the prediction modes, the prediction mode requiring the least coding effort is selected for H.263. In this context it is known to the average person skilled in the art which prediction modes are the simplest to code.

In an alternative embodiment of the invention the first coding method is H.263, the first image blocks being coded using intra-prediction modes in the frequency domain, and the second coding method is H.264, wherein the second intra-blocks are coded using intra-prediction modes in the local area.

In the last-described embodiment of the invention the second intra-prediction modes are determined from the first intra-prediction modes as follows:

a prediction error is determined for each (8×8) pixel block of a macro block coded in a first intra-prediction mode in H.263, if the determined prediction error of at least one (8×8) pixel block of the macro block lies above a predefined threshold, the (8×8) pixel blocks of the macro block are coded in H.264 using an INTRA4 prediction mode, a recalculation of the prediction mode in H.264 being performed for the (8×8) pixel blocks whose prediction error lies above the threshold, and the same INTRA4 prediction mode as in H.263 being assigned in each case to the remaining (8×8) pixel blocks in H.264;

if the determined prediction errors of all (8×8) pixel blocks of the macro block do not lie above the predefined threshold, the same INTRA16 prediction mode is assigned to the macro block in H.264 as to the (8×8) pixel blocks in H.263.

The purpose achieved in this way is that a recalculation of the prediction mode is performed only when the prediction error is very great, and otherwise the same prediction mode is used in H.264 as in H.263. In this case the prediction error is preferably determined by a summation over the Discrete Cosine Transformation (DCT) coefficients of the respective (8×8) pixel block of the macro block.

In a second variant of the invention a method for transcoding a data stream is de-scribed wherein the input data stream coded using the first coding method does not necessarily also include first intra-prediction modes. With this variant, intra-prediction modes for a second coding method are determined with the aid of image information from the first coding method, the second coding method supporting an intra-prediction. The prediction modes determined by the image information are then used for coding the intra-blocks of the output data stream. In a preferred embodiment, in particular the DCT coefficients of image blocks in the frequency domain which were determined in the first coding method are used as image information from the first coding method. In analogy to the first variant of the method according to the invention, prediction errors determined in the first coding method can additionally be taken into account for determining the prediction modes in the first coding method.

As well as the above-described methods for transcoding, the invention also relates to a device for transcoding a data stream, the device being embodied in such a way that the above-described transcoding methods according to the invention can be performed using this device.

BRIEF DESCRIPTION OF THE DRAWINGS

These and other objects and advantages of the present invention will become more apparent and more readily appreciated from the following description of exemplary embodiments, taken in conjunction with the accompanying drawings of which.

DETAILED DESCRIPTION OF THE PREFERRED EMBODIMENT

Figure 1:
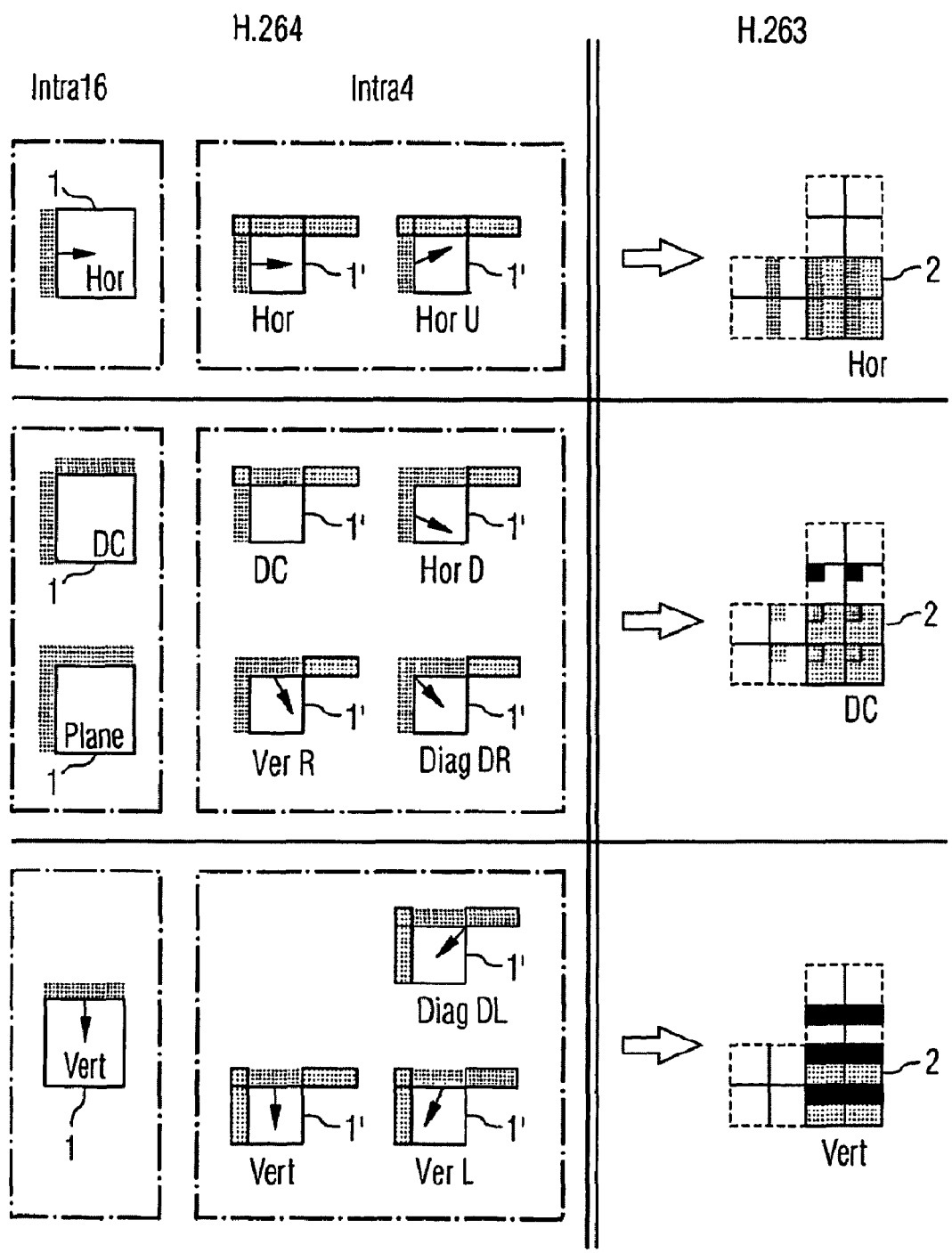
FIG. 1 is a schematic sketch illustrating operations in a first embodiment of the method according to the invention.

Reference will now be made in detail to the preferred embodiments of the present invention, examples of which are illustrated in the accompanying drawings, wherein like reference numerals refer to like elements throughout.

FIG. 1 illustrates a method for transcoding from the video coding standard H.264 (see ITU-T Rec. H.264) to the video coding standard H.263 (see ITU-T Rec. H.263). In H.264 there exist a plurality of intra-prediction modes which are used for locally predicting the macro blocks of an image consisting of 16×16 pixels. A so-called INTRA16 prediction, which is depicted in the left part of FIG. 1, is differentiated here. With the type of prediction the macro blocks referenced by 1 are predicted as a whole. There are four different possibilities in this regard, designated in FIG. 1 as HOR, DC, PLANE and VERT These different prediction modes are described in detail in the H.264 standard, so the precise methods of the predictions performed in these modes will not be dealt with any further here. It should, however, be noted that the different predictions are performed in the local area, the difference between the pixel of a macro block currently to be coded and the pixel lying next to the macro block in the horizontal or vertical direction being determined as the prediction signal in the horizontal or vertical prediction HOR or VERT respectively. Conversely, with the prediction mode DC the difference with respect to a mean value of adjacent pixels is determined.

As well as the INTRA16 prediction modes just described, H.264 also defines what are referred to as INTRA4 prediction modes, in which the prediction is performed for individual (4×4) pixel sub-blocks 1' of a macro block (see middle section of FIG. 1). There are a total of nine INTRA4 prediction modes, designated in FIG. 1 as HOR, HorU, DC, HorD, VerR, DiagDR, DiagDL, VERT and VerL. A precise description of these prediction modes will likewise be skipped here, since they are known to the average person skilled in the art and are described in particular in ITU-T Rec. H.264.

The different prediction modes in H.263 are illustrated in the right-hand part of FIG. 1. In this standard there are only the intra-prediction modes HOR, DC and VERT, which will likewise not be described here in detail. A precise description of these modes can be found in ITU-T Rec. H.263. In the prediction modes in H.263 the macro blocks designated by the reference numeral 2 are predicted locally, the macro blocks in H.263 containing DCT coefficients (DCT=Discrete Cosine Transformation) as pixel information, i.e. they are macro blocks in the frequency domain.

The three gray-shaded arrows in FIG. 1 serve to indicate how, according to the inventive method, the prediction modes from H.264 are assigned corresponding prediction modes from H.263. The inventors were able to establish in the course of experiments that the assignment shown in FIG. 1 yields good results, as will be described in the following with reference to FIG. 2.

According to the embodiment of FIG. 1, macro blocks coded in the INTRA16 prediction mode HOR in H.264 are also coded in the prediction mode HOR in H.263. Macro blocks coded in the INTRA16 prediction mode DC or Plane in H.264 are coded in the intra-prediction mode DC in H.263. The prediction mode VERT is used in H.263 for macro blocks coded in the INTRA16 prediction mode VERT in H.264. In an INTRA4 prediction a check is first made for all 16 (4×4) pixel sub-blocks 1' of a macro block to determine which prediction mode occurs most frequently. If the prediction mode HOR or HorU occurs most frequently, coding takes place in H.263 using the prediction mode HOR. If, on the other hand, the prediction mode DC or HorD or VerR or DiagDR occurs most frequently in H.264, coding takes place in H.263 using the prediction mode DC. If, however, the prediction mode DiagDL or VERT or VerL occurs most frequently in H.264, the prediction mode VERT is used in H.263.

If the situation should arise in an INTRA4 prediction under H.264 that certain modes occur with equal frequency, the mode involving the least coding effort is used in H.263. It is known to the average person skilled in the art how the individual modes in H.263 are to be rated in terms of the coding effort.

Figure 2:
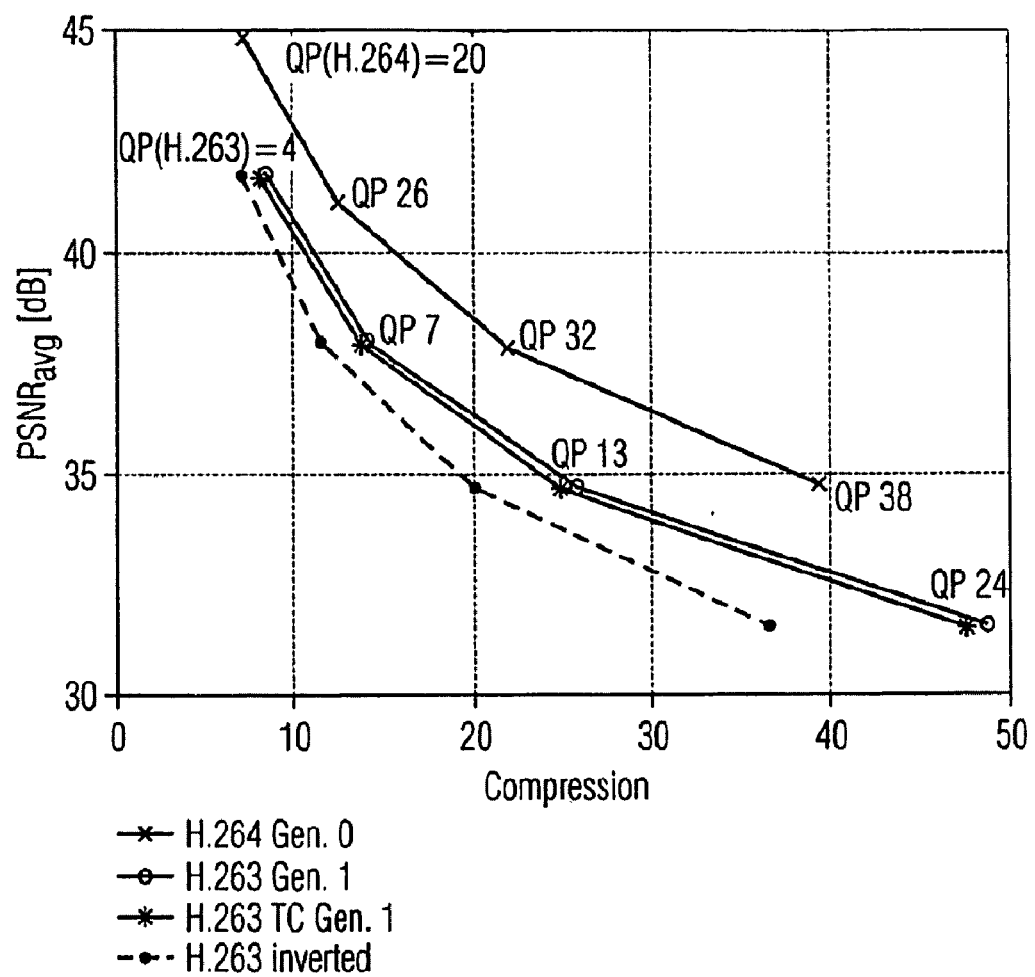
FIG. 2 is a graph which shows the compression efficiency achieved with the first embodiment of the invention compared with known methods.

FIG. 2 shows a diagram which represents the result of the method according to the invention from FIG. 1 in graphical form. In this case the compression factor (factor by which the output file is smaller than the input file) is plotted on the x-axis, and the average PSNR in dB (PSNR=Peak Signal-to-Noise Ratio) is plotted on the y-axis. The PSNR represents the quality of the transcoded data stream. The curve designated by H.264 Gen.0 shows a video coding using H.264 which exhibits good compression at the same time as high quality. The curve designated by H.263 Gen.1 shows a transcoding according to the related art, wherein a data stream coded using H.264 is decoded and subsequently coded in H.263 by a complete recalculation of the prediction. Contrasting therewith, the curve H.263 TC Gen.1 shows the result of the method according to the invention. The method according to the invention has a much lower complexity than the method H.263 Gen.1, since no further recalculations of the predictions in H.263 are necessary and these recalculations make up approx. 90% of the calculations of the transcoding. As can be seen from FIG. 2, the method H.263 TC Gen.1, in spite of a reduction in complexity, yields similarly good results to the method H.263 Gen.1. Owing to the reduction in complexity the method according to the invention thus represents a significant improvement over known methods.

Also shown in FIG. 2 is the result of a method designated as H.263 inverted, this method using a prediction mode for the transcoding in H.263 that is inverted compared to the method according to the invention. It is shown that the good results obtained with the method H.263 TC Gen.1 are not achieved in this case.

Figure 3:
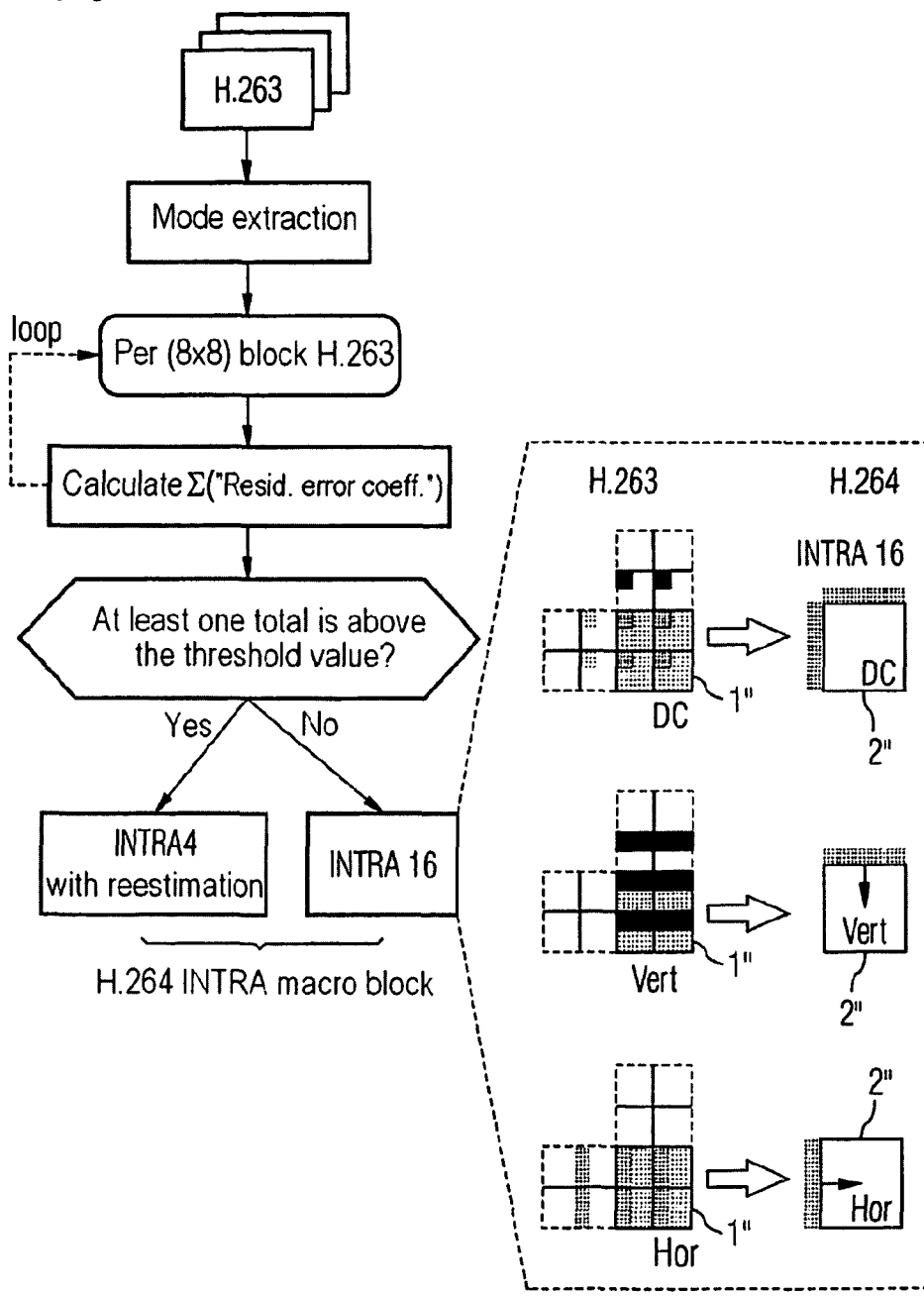
FIG. 3 is a flow chart and a schematic sketch of a second embodiment of the method according to the invention.

A second exemplary embodiment of the method according to the invention is shown schematically in FIG. 3. With this method, intraframe-coded images of an H.263 data stream are transcoded into an H.264 data stream. In this case there is the problem that the coding standard H.264 provides a much greater number of intra-prediction options than H.263, so a corresponding assignment with respect to the exemplary embodiment of FIG. 1 must be structured differently. The aim in this embodiment is to perform a recoding with re-estimation of the prediction mode in H.264 in cases of a poor prediction of an H.264 prediction mode. This corresponds to the case that the prediction mode used in H.264 is not available in H.263.

As can be seen in the left part of FIG. 3, the mode used for the corresponding macro block is first extracted for the purpose of the transcoding according to the invention. It is taken into account here that in H.263 a macro block consists of four (8×8) pixel blocks, designated as 1'' in the right-hand part of FIG. 3. Next, a so-called prediction error is calculated for each of these (8×8) blocks, which error is the sum total of all residual error coefficients of the pixels of the corresponding (8×8) block. The value of the prediction error is buffered for all four blocks of a macro block and subsequently it is determined whether a sum total of the residual error coefficients exceeds a predefined threshold value. If this is the case, the image blocks in H.264 are coded using an INTRA4 prediction mode, the prediction mode being recalculated in H.264 for the (8×8) pixel blocks whose prediction error lies above the threshold.

If, on the other hand, the sum total of the residual error coefficients for all (8×8) pixel blocks of a macro block lies below the threshold value, an INTRA16 coding is performed in H.264 using a prediction mode which corresponds to the prediction mode of the (8×8) pixel blocks in H.263. This is shown again in the right-hand part of FIG. 3. It follows that in the case where INTRA16 coding is used, the corresponding INTRA16 prediction mode DC for the (16×16) pixel macro block 2' in H.264 is assigned to the prediction mode DC used for the (8×8) pixel blocks 1" in H.263. Similarly, the H.263 prediction mode VERT is assigned the corresponding prediction mode VERT in H.264. The same applies to the prediction mode HOR in H.263, to which the corresponding INTRA16 prediction mode HOR is assigned in H.264.

Figure 4:
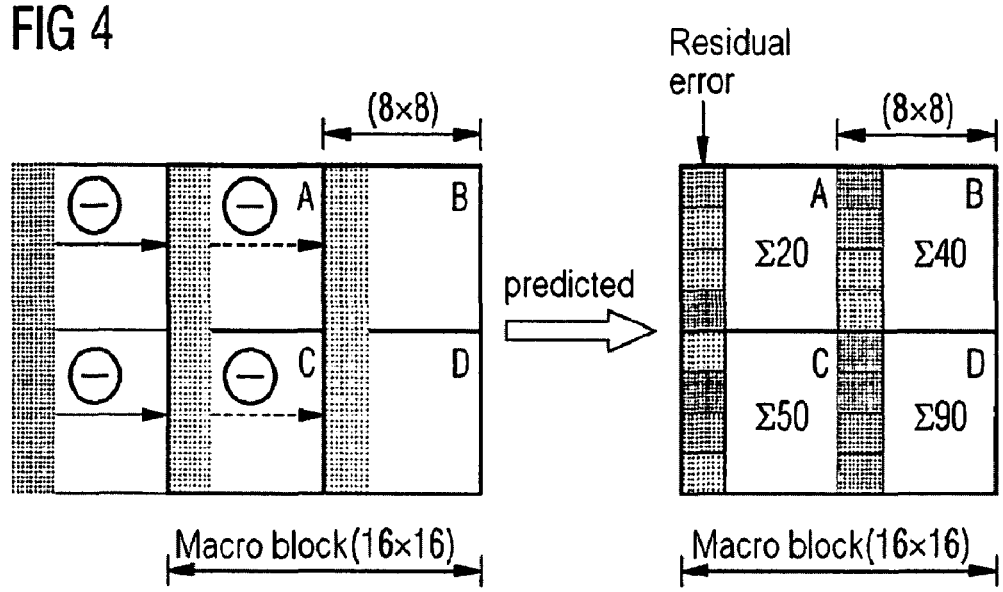
FIG. 4 is a sketch which illustrates a part of the method according to FIG. 3 in detail.

The previously described determination of the residual error coefficients is represented graphically in the upper section of FIG. 4, a macro block consisting of (8×8) pixel blocks A, B, C and D being considered and the residual errors being indicated by shading. In example 1 of FIG. 4 the threshold value according to FIG. 3 is fixed at $\Delta max=40$. For the individual (8×8) pixel blocks of the macro block it follows according to example 1 that the sum total of the residual errors $$\sum_{\forall i} Ci$$

for the blocks C and D lies above the threshold value 40. Thereupon, all blocks A, B, C and D are INTRA4-coded, although a re-estimation of the prediction mode is performed only for the blocks C and D. Contrasting herewith, the prediction mode from H.263 is simply taken over for the blocks A and B in the transcoding. In example 2 of FIG. 4 the threshold value is set at 100, so the sum total of the residual errors for all (8×8) pixel blocks lies below the threshold value. As a result an INTRA16 coding is performed in H.264.

According to a third exemplary embodiment of the invention which is not represented graphically, the transcoding method according to the invention can also be used when transcoding is performed from a block-based coding standard without local intra-prediction to a standard with intra-prediction. A possible transcoding from MPEG-1 or MPEG-2 to H.263 or H.264 could serve as an example of this. In this embodiment there is the possibility of determining the prediction direction by way of further coding information, such as, for example, the difference of the DC portion of the DCT coefficients of the macro block. For example, the prediction direction could be determined in analogy to the MPEG-4 standard and subsequently used in H.263. Instead of the difference of the DC portion of the DCT coefficients, a preferred prediction mode could also be derived from the AC portion of the DCT coefficients. In a method in which transcoding is performed according to H.264, the prediction error should additionally be included in the determination of the prediction mode, with in this case an analogous approach to the procedure shown in FIG. 3 being followed.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. The method for transcoding a data stream containing at least one coded digitized image, comprising:
converting an input data stream of first intra-blocks coded using H.264 into an output data stream of second intra-blocks coded using H.263, where the first intra-blocks are each coded in a first prediction mode among a plurality of first intra-prediction modes in a local area and the second intra-blocks are each coded in a second prediction mode among a plurality of second intra-prediction modes, different from the first intra-prediction modes, in a frequency domain; and
determining the second intra-prediction modes based on the first intra-prediction modes prior to selecting the second prediction mode used in coding the second intra-blocks by
assigning, if a macro block is coded in H.264 using INTRA16 prediction mode HOR, the INTRA16 prediction mode HOR to corresponding four pixel blocks in H.263;
assigning, if the macro block is coded in H.264 using INTRA16 prediction mode DC or PLANE, the INTRA16 prediction mode DC to the corresponding four pixel blocks in H.263;
assigning, if the macro block is coded in H.264 using INTRA16 prediction mode VERT, the INTRA16 prediction mode VERT to the corresponding four pixel blocks in H.263; and
determining, if pixel blocks of the macro block are coded in H.264 using INTRA4 prediction modes, a frequency of macro block prediction modes in the macro block and assigning the second prediction modes as a function of a most frequently occurring one of the macro block prediction modes as follows
assigning, if one of INTRA4 prediction modes HOR and HorU occurs most frequently, the INTRA4 prediction mode HOR to corresponding four pixel blocks of the macro block in H.263;
assigning, if one of INTRA4 prediction modes DC, HorD, VerR and DiagDR occurs most frequently, the INTRA4 prediction mode DC to the corresponding four pixel blocks of the macro block in H.263; and
assigning, if one of INTRA4 prediction modes DiagDL, VERT or VerL occurs most frequently, the intra-prediction mode VERT to the corresponding four pixel blocks of the macro block in H.263.

2. The method as claimed in claim 1, wherein when said determining finds the INTRA4 prediction modes occur with equal frequency, a prediction mode requiring least coding effort is selected for H.263.

3. The method for transcodinq a data stream containing at least one coded digitized image, comprising:
converting an input data stream of first intra-blocks coded using H.264 into an output data stream of second intra-blocks coded using H.263, where the first intra-blocks are each coded in a first prediction mode among a plurality of first intra-prediction modes in a local area and the second intra-blocks are each coded in a second prediction mode among a plurality of second intra-prediction modes, different from the first intra-prediction modes, in a frequency domain; and
determining the second intra-prediction modes based on the first intra-prediction modes prior to selecting the second prediction mode used in coding the second intra-blocks by
determining a prediction error for each pixel block of a macro block coded in the first prediction mode in H.263;
coding, if the prediction error of at least one pixel block of the macro block lies above a predefined threshold, the pixel blocks of the macro block in H.264 using an INTRA4 prediction mode, including recalculation of the INTRA4 prediction mode in H.264 for first pixel blocks for which the prediction error lies above the predefined threshold, and assigning the INTRA4 prediction mode used in H.263 to second pixel blocks in H.264 for which the prediction error is not above the predefined threshold, and assigning, if the prediction error for each pixel block in the macro block does not lie above the predefined threshold, an INTRA16 prediction mode used in H.263 to the macro block in H.264.

4. The method as claimed in claim 3, wherein the prediction error is a sum total of Discrete Cosine Transformation coefficients of the pixel block of a macro block.

5. A device for transcoding a data stream containing at least one coded digitized image, comprising:

at least one processor programmed to convert an input data stream of first intra-blocks coded using H.264 into an output data stream of second intra-blocks coded using H.263, where the first intra-blocks are each coded in a first prediction mode among a plurality of first intra-prediction modes in a local area and the second intra-blocks are each coded in a second prediction mode among a plurality of second intra-prediction modes, different from the first intra-prediction modes, in a frequency domain; and determine the second intra-prediction modes based on the first intra-prediction modes prior to selecting the second prediction mode used in coding the second intra-blocks by determining a prediction error for each pixel block of a macro block coded in the first prediction mode in H.263;

coding, if the prediction error of at least one pixel block of the macro block lies above a predefined threshold, the pixel blocks of the macro block in H.264 using an INTRA4 prediction mode, including recalculation of the INTRA4 prediction mode in H.264 for first pixel blocks for which the prediction error lies above the predefined threshold, and assigning the INTRA4 prediction mode used in H.263 to second pixel blocks in H.264 for which the prediction error is not above the predefined threshold, and assigning, if the prediction error for each pixel block in the macro block does not lie above the predefined threshold, an INTRA16 prediction mode used in H.263 to the macro block in H.264.

\* \* \* \* \*